United States Patent

[11] 3,583,336

| [72] | Inventor | Giuseppe Vallerga<br>Rome, Italy |
|---|---|---|
| [21] | Appl. No. | 814,697 |
| [22] | Filed | Apr. 9, 1969 |
| [45] | Patented | June 8, 1971 |
| [73] | Assignee | Societa Del Boy S.r.L.<br>Rome, Italy |

[54] APPARATUS FOR AUTOMATICALLY STUFFING BAKERY PRODUCTS
7 Claims, 9 Drawing Figs.

| [52] | U.S. Cl. | 107/1 |
|---|---|---|
| [51] | Int. Cl. | A23g 3/20 |
| [50] | Field of Search | 107/1, 1.9, 54; 99/256, 257 |

[56] References Cited
UNITED STATES PATENTS

| 2,625,119 | 1/1953 | Jennings | 107/1 (.9) |
|---|---|---|---|
| 3,322,073 | 5/1967 | McKown et al. | 107/1 (.9) |

*Primary Examiner*—Louis K. Rimrodt
*Attorney*—Richards and Geier

ABSTRACT: An apparatus for automatically stuffing bakery products, such as biscuits, bread loaves and sticks with a paste, which can be alimentary or medicinal, or both, includes a hopper, a vibrated chute and a conveyor having cavities receiving pieces to be stuffed. Means are provided for filling empty cavities. Hollow needles inject the paste into these pieces. A pump is used for feeding the paste to the needles. The conveyor is moved intermittently by a shaft which also actuates the pump. A blower is used to clean the needles and to help the injection of the paste.

PATENTED JUN 8 1971

INVENTOR.
G. Vallerga
BY
Richards & Geier
ATTORNEYS

APPARATUS FOR AUTOMATICALLY STUFFING BAKERY PRODUCTS

The object of this invention in an apparatus for automatically stuffing bakery products such as biscuits and bread loaves, sticks and rolls of different form with a paste of alimentary and/or medicamental characters. This operation is usually carried out by hand that is by cutting the previously baked piece and introducing the paste with a syringe or in any other way.

A hand operated machine has recently been disclosed for speeding up the manufacturing of stuffed pieces which in addition permits the stuffing of bakery products with hard crust. Such machine comprises a slide within which a cylinder is provided with a piston which slide is reciprocated by hand along horizontal guides of the stationary frame of the machine towards and away from the piece to be stuffed. A hollow needle of hard material is attached at the front side of the slide and communicates with the head of the cylinder.

The slide is first moved towards the piece to pierce it with the needle and penetrate for substantially the whole length of it. The reverse movement of the slide causes automatically the advancement of the piston along the cylinder whereby the paste is forced out of it through the needle into the piece to be stuffed at a rate which is substantially constant during the withdrawal of the needle from the piece. Such a machine being hand operated is not adapted for mass production.

It is therefore an object of this invention to provide a machine which while applying in general the same operating principle of the aforementioned machine, is greatly improved in many aspects, is fully automatic and adapted for mass production.

This invention will be better understood from the following description and drawing of a preferred embodiment thereof given by way of a nonlimitative example.

Figure 1:
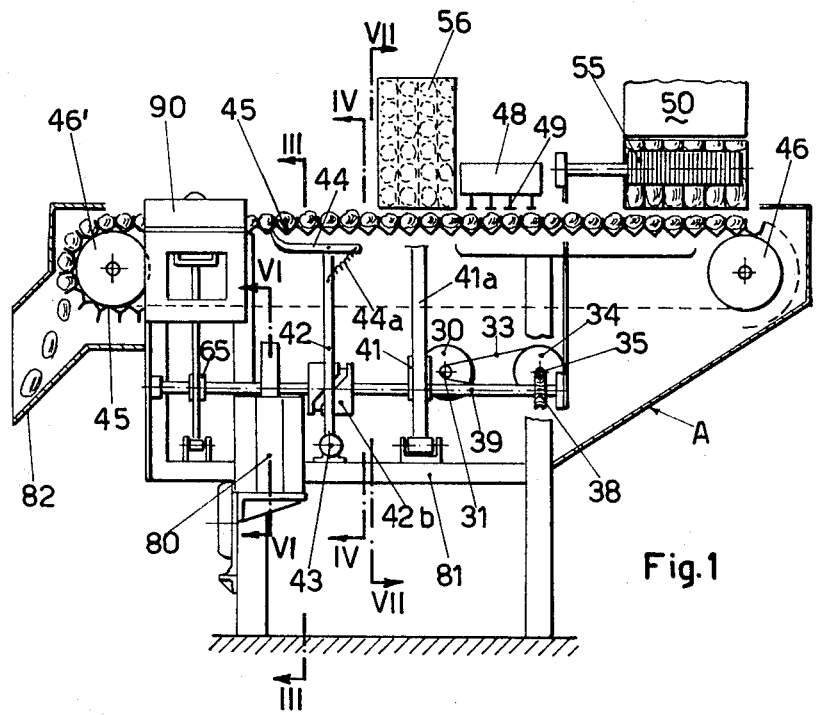
FIG. 1 is a schematic side view of the apparatus of this invention with some portions removed therefrom for showing the inner components.
Figure 2:
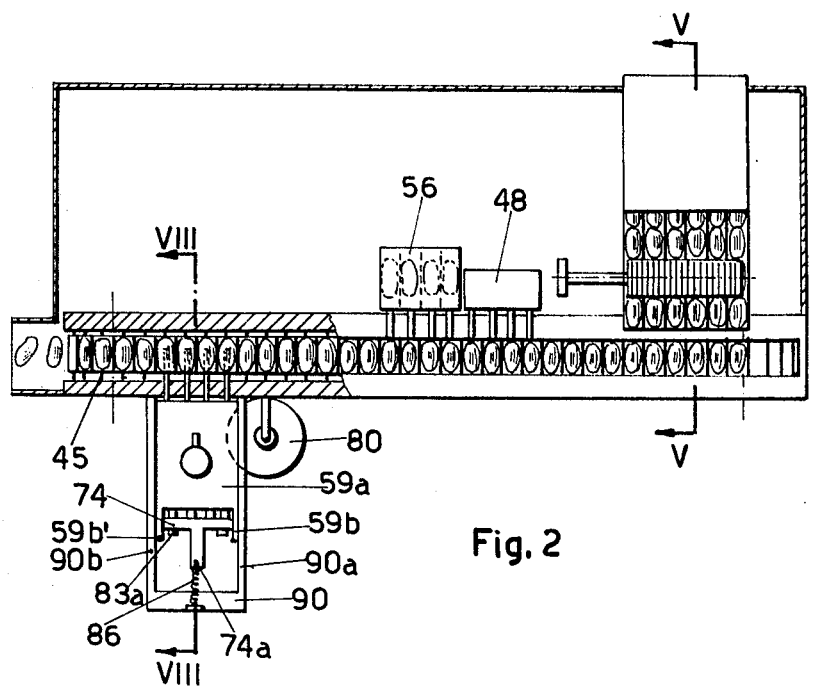
FIG. 2 is a schematic plan view of the apparatus of FIG. 1.
Figure 5:
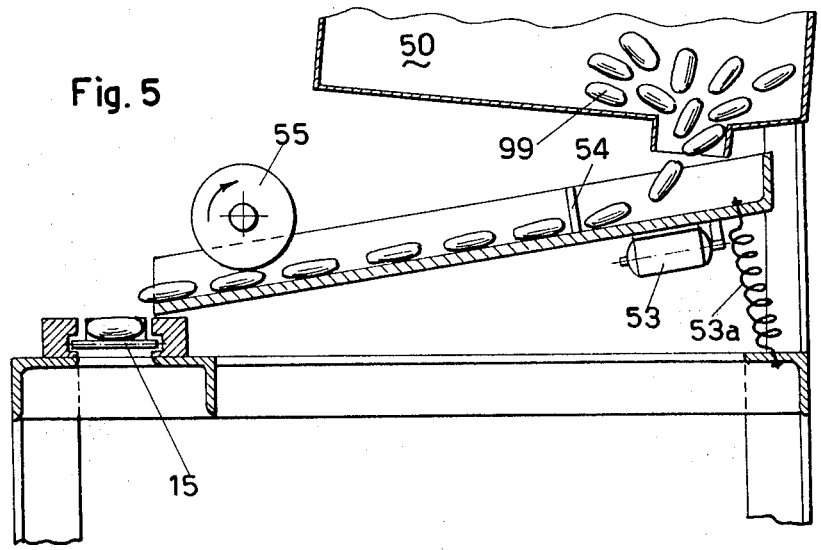
FIG. 5 is a schematic cross section taken along line V-V of FIG. 1 and illustrates in detail the mechanism for charging the pieces to be stuffed and feeding them to the conveyor.

With reference to the drawings such apparatus comprises a boxlike frame A with four legs. On top of frame A at the right end thereof as seen in FIG. 1, a hopper 50 is mounted into which the pieces to be stuffed are charged. Under hopper 50 a vibration chute 52 (FIG. 5) is provided for receiving the pieces therefrom and orderly feeding them into a row of regularly spaced cavities on the surface of conveyor 45. The latter passes them under a filling up assembly which fills the empty cavities, if any, with fresh pieces dropped from a reservoir 56. The next station along the conveyor path is the stuffing device 59 which is provided with a plurality of injectors 71 (see FIGS. 8 and 9) to which the enriching paste is fed from a pump 80. Eventually the stuffed pieces are discharged through a chute 82 (see FIG. 1). Within frame A the mechanisms are contained for transmitting the motion to the different operating assemblies of the apparatus that is: a driving motor 30 and related pulley 31 and belt 33 for driving pulley 34 keyed on shaft 39 which is the main driving shaft of the apparatus and extends lengthwise of frame A in the same direction as conveyor 45. On shaft 39 there are mounted a cam 41 (see FIG. 7) for driving a swinging lever 41a which actuates the filling up device 56; a cylinder 41b with a sinusoidal groove on its outer surface for driving another swinging lever 42 which intermittently actuates the forward movement of conveyor 45; another cam 61 (not visible on FIG. 1 because of item 80 being located in front of it) for driving lever 107 which actuates the piston 103 of pump 80 (see FIG. 6) whereby the stuffing paste is fed to the stuffing device 59 and last, cam 65 for driving lever 67 which reciprocates the same devices.

The above mentioned assemblies will now be described in greater detail.

Figure 4:
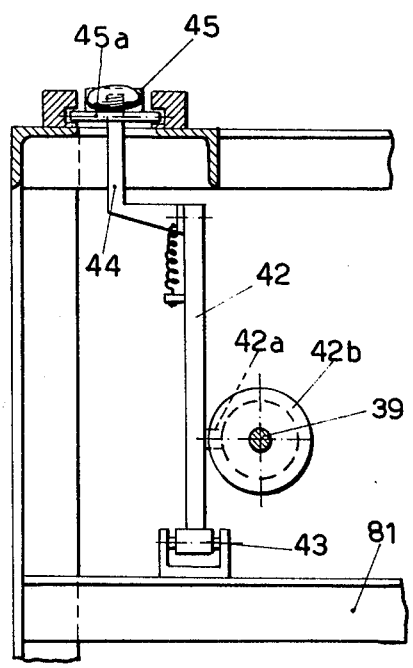
FIG. 4 is a schematic cross section taken along line IV-IV of FIG. 1 and illustrates in detail the mechanism for advancing the conveyor.

The assembly for feeding the pieces to be stuffed onto conveyor 45 comprises a hopper 50 (FIG. 5) at a level higher than the conveyor which hopper is provided with a bottom opening 50a under which a chute 52 is located with grooves along the slope thereof which lead to the conveyor. For achieving an orderly and regular travel of pieces 99 along chute 52 the following is provided: a vibrating motor which cooperates with a spring system 53a; a rake 54 which comprises a row of vertically extending partitions which separate from one another for a length the grooves of the chute to get the pieces lined along them; a rotating broom 55 revolving in the same direction as the advancing pieces for accompanying them towards the conveyor. The latter is moved intermittently for lengths comprising a fixed number of cavities. Such number which is related to the number of pieces that can be simultaneously stuffed by the stuffing device, is four in the present embodiment given by way of example; however it is obvious that a greater or smaller number of pieces can be stuffed at the same time by only varying the size of the apparatus. The intermittent movement of conveyor 45 is achieved as follows (see FIG. 4). On a horizontal member 81 of frame A the lower end of vertical lever 42 is swingably mounted by means of pivot 43. At a distance from the latter said lever is provided with a cam follower 42a cooperating with a substantially sinusoidal groove on the outer surface of a cylinder 42b which is keyed on shaft 39. Consequently, lever 42 is driven to swing in a plane parallel to the path of conveyor 45. At the upper end of lever 42 a ratchet 44 is mounted which is biased by a spring 44a to engage the ribs 45a of which conveyor 45 is provided under each cavity thereof. The same ribs which project at both sides of the conveyor extend into a pair of grooves into rails 45c for guiding the conveyor along its path. Ratchet 44 when moved to the left as seen in FIG. 1 causes the forward movement of conveyor 45 and mean moved to the right slides on ribs 45a without causing any movement of the same conveyor. As already mentioned the forward travel of conveyor 45 in this embodiment is for lengths corresponding to four cavities.

The filling up assembly (see FIGS. 1 and 7) comprises a feeling device 48 with four independent spring biassed plungers 49 which cooperate with as many electric switches. The feeling device is vertically reciprocated by means not shown, in a way that after each stopping of conveyor 45 the plungers are lowered on the four pieces stationing under them and as a consequence they are depressed against the force of said spring if a piece is contained in the corresponding cavity of the conveyor. However if even one only of the four cavities is void the corresponding plunger is not depressed. This causes solenoid 120 to become energized and to release lever 41a by attracting hook 121. In the meantime conveyor 45 has moved forwards and the four cavities which had just passed under the feeling device are now in front of container 56. Lever 41a is now in contact with cam 41 which moves it and the associated reservoir 56 towards the conveyor 45 and back through a complete reciprocating cycle. From the bottomless reservoir as many pieces are dropped on conveyor 45 as there are voids detected by the feeler. At the end of the reciprocating cycle lever 41a becomes engaged with hook 121 and retained therein until a new signal of void cavities is delivered from the feeling device.

Figure 3:
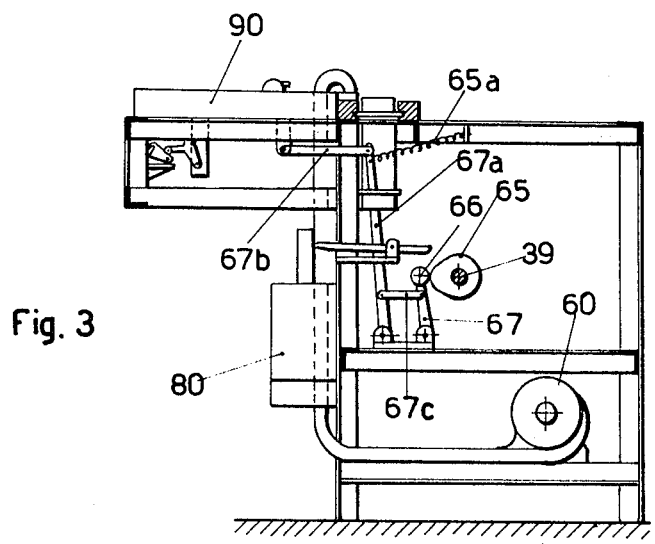
FIG. 3 is a schematic cross section taken along line III-III of FIG. 2 and illustrates in detail the mechanism for actuating the stuffing device.

The stuffing device comprises a slide 59 (see FIG. 3) which is reciprocated along guides at right angle to conveyor 45 by means of cam 65, cam follower 66, lever 67, link 67c, lever 67a and link 67b, cam follower 66 being constantly forced to abut against cam 65 by spring 65a. At the front of slide 59 (see FIGS. 8 and 9) which faces the pieces on conveyor 45 four hollow needles 71 are attached which communicate with the head ends of as many horizontal cylinders 70 which are provided within the slide body 59a coaxially with said needles. In front of cylinders 70 there is a parallelepipedal chamber 76 which extends crosswise of slide 59; on the front wall of chamber 76 four larger hollow needles 72 with open ends are attached coaxial to said needles 71 and communicating with chamber 76. The reciprocal position of needles 71 and 72 is not subject to changes during the operation of the apparatus because both are firmly attached to the same structure. Between the front face of slide 59 and the pieces on conveyor 45 a second parallelepipedal chamber 87 is provided the walls of which are attached to the frame A of the apparatus. Chamber 87 has an inlet fitting 88 on top of it and a discharge opening 89 at the bottom. Needles 72 during the reciprocating motion of slide 59 are moved across chamber 87 through circular openings at the opposite vertical walls of the same at right angles to the needles. Within cylinders 70, as many pistons 73 are slidably fitted the rear ends of which are attached to a common transverse bar 74. Body 59a of slide 59 is provided with two flat arms 59b and 59b' which project from the rear face of it along the sides 90a and 90b of frame 90 by which slide 59 is guided in its reciprocating movement. Arms 59b are provided with projections 59c which extend downwards to form a pivotal connection for first arm 83c of a three arm lever 83 of which a second arm 83a with forked end is applied on bar 74 and a third arm slidably abuts against a straight adjustable cam 85 through a cam follower roller. Bar 74 is guided at its ends by slits 59d which are provided lengthwise of arms 59b and is biassed backwards by spring 86 which is connected at one end thereof to frame 90 and at the other end to a projection 74a integral with bar 74. In this way when slide 59 from its farthest forward position is moved back, lever 83 forces pistons 73 into cylinders 70. Cylinders 70 all communicate with a manifold 69 to which the stuffing paste is fed from a pump 80 which will be described thereinafter. The operation of the stuffing device is as follows.

Figure 8:
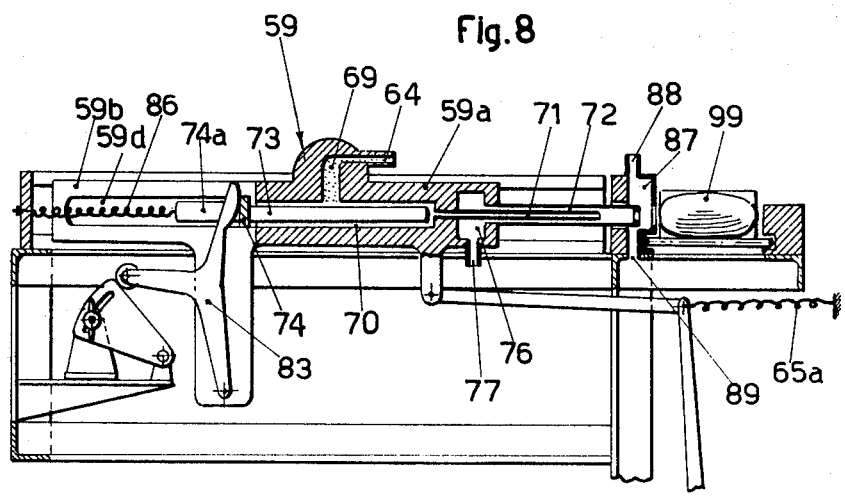
FIG. 8 is a cross section of the filling up device taken along line VIII-VIII of FIG. 2.
Figure 9:
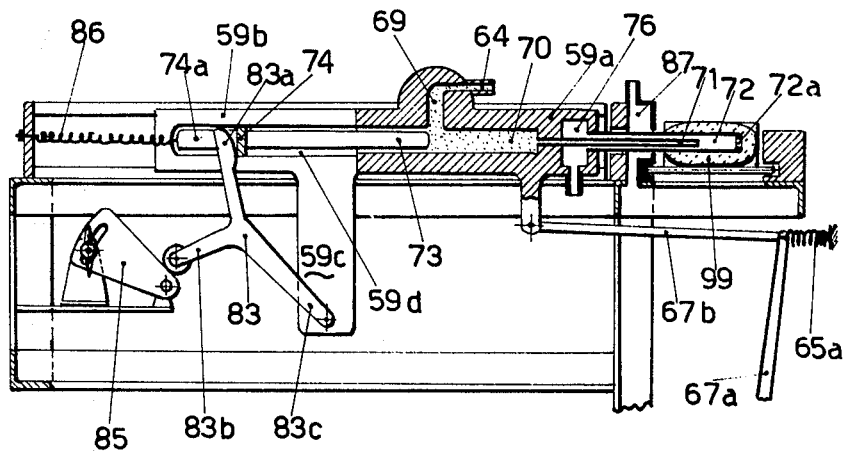
FIG. 9 is a cross section of the filling up device perpendicular to the motion of the conveyor.

Let us assume that the device is in the situation depicted in FIG. 8 that is with empty pieces on conveyor 45 which has just stopped for the stuffing of the same. Cam 65 moves than lever 67a to the right and needles 72 are introduced into pieces 99, at the same time due to lever 83 rotating counterclockwise as a consequence of being guided by cam 85, pistons 73 are withdrawn from cylinders 70 until the paste under pressure can find its way towards cylinders 70 and fill them. However due to its viscosity the paste cannot pass across needle 71. The situation is now as depicted in FIG. 9. At this moment slide 59 is moved to the left and due to the clockwise rotation of lever 83, pistons 73 are forced into cylinders 70 and the paste is injected at a constant rate into pieces 99. At the same time fitting 77 pressurized air is introduced for short period through inlet fitting 77 into chamber 76 and the space between needles 71 and 72. The purpose of this is for helping the paste outflowing from needle 72 and cleaning the point of needle 71. Lever 83 cooperating with inclined cam 85 ensures the delivery of a substantially constant amount of paste from needle 72 all along the stroke of slide 59. This amount may be varied by changing the slope of cam 85. When slide 59 has accomplished its backward stroke, the position of the points of needles 72 is within chamber 87. At this moment a strong blast of air is sent into chamber 87 through fitting 88 for cleaning the open ends of needles 72. The air required for this purpose the same as for feeding chamber 76 is supplied by a blower 60 and the flow of air is controlled by means of a valve which is actuated by a cam of shaft 39.

Figure 6:
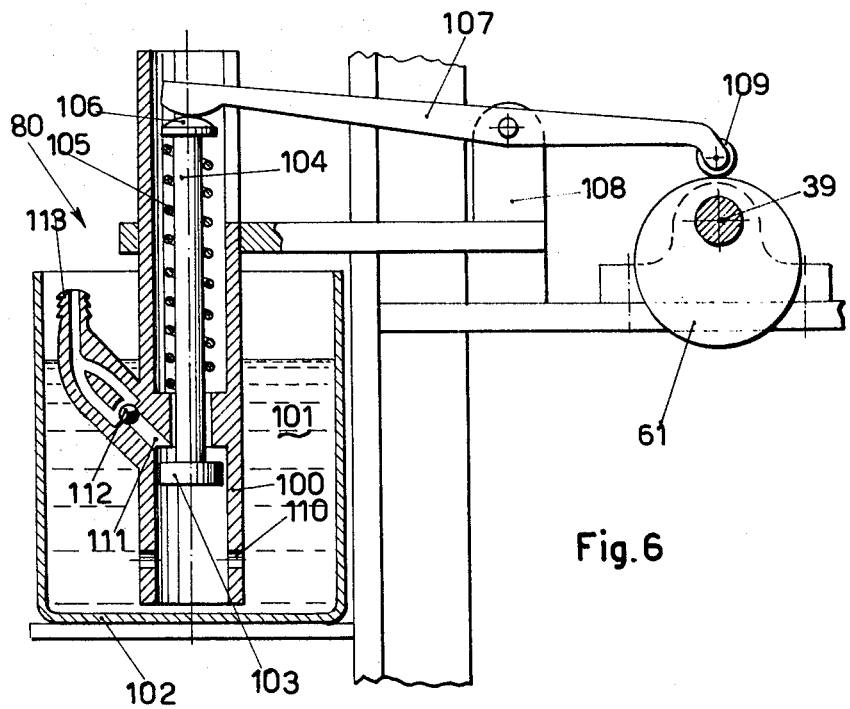
FIG. 6 is a schematic cross section taken along line VI-VI of FIG. 1 and illustrates in detail the pump for feeding the paste to the stuffing device and the related actuating mechanism.
Figure 7:
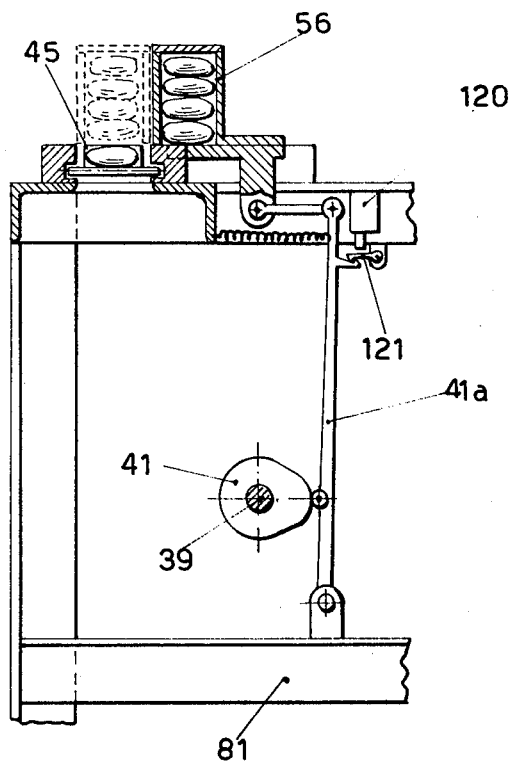
FIG. 7 is a schematic cross section taken along line VII-VII of FIG. 1 and illustrates in detail the filling up device and the related actuating mechanism.

Pump 80 will now be described which delivers the paste under pressure to cylinders 70 (FIG. 6). Pump 80 comprises a vertical cylinder 100 which is submerged under the paste 101 contained in a reservoir 102. With cylinder 100 a piston 103 is slidable which has a spiral spring 105 wound around its rod 104 for forcing piston 103 upwards. Piston rod 104 has a cupheaded end for abutting against one end of a lever 107 of which the fulcrum rests on a support 108 integral with the frame of the apparatus while the other end abuts upon cam 61 keyed on shaft 39 through a cam follower 109. Cylinder 100, next to its lower open end is provided with a plurality of parts 110 through which the paste 101 from reservoir 102 gets into cylinder 100 when piston 103 has reached the lowermost position along the cylinder and thereby has produced a vacuum in it. At the top wall of cylinder 100 a port 111 is provided which communicates with a discharge fitting 113 through a check valve 112. Fitting 113 is connected to fitting 64 of slide 59 through a line not shown. The operation of the pump is as follows: The setting of cam 61 on shaft 39 is such that after pistons 73 have discovered manifold 69, piston 103 is at its lowermost position along cylinder 100 and this is filled up with paste. From this position piston 103 is lifted up by spring 105 as cam 61 rotates. As a consequence, paste 101 is forced through port 111 and valve 112 towards cylinders 70. The geometrical displacement of pump 80 is larger than the total displacement of cylinders 70 and therefore the latter will be certainly filled up with one stroke of piston 103. Because the delivery pressure of pump 80 is controlled by spring 105 the latter functions as a pressure regulator and by adjusting the force of spring 105 the delivery pressure is adjusted to fit the viscosity characteristics of the different pastes.

One embodiment of the present invention has been described as a nonlimitative example, thereof. It is obvious that many changes and modifications may be introduced in it by those skilled in the art. However it should be understood that such modifications and changes are to be considered within the scope of the appended claims.

What I claim is:

1. An apparatus for automatically stuffing bakery products such as biscuits or bread loaves and sticks with a paste which may be alimentary or medicamental or both which apparatus comprises the following means in the order: a hopper, a vibrated chute, a conveying means provided with cavities for receiving into each of them a piece to be stuffed; a filling up means for filling any empty cavities on said conveyor; a means for stuffing said pieces which is provided with a plurality of hollow needles through which the paste is injected into said pieces; a means for intermittently advancing for successive lengths said conveyor and a pump for feeding at a pressure controlled by a spring said paste to said stuffing means; said means and said pump being all actuated by a single shaft of which the axis is parallel to the advancing direction of said conveyor and which is contained in the apparatus frame; the latter being also provided with a blower for supplying pressurized air for aiding the injection of the paste and for cleaning the injecting needles.

2. An apparatus as per claim 1, wherein said chute is vibrated by means of an electric motor attached thereto which cooperates with a spring system said chute being provided with a rack midway of its slope and a rotating broom downstream of said rack for achieving an orderly travel of the pieces towards said conveyor.

3. An apparatus as per claim 1, wherein said filling up means comprises a box adapted for being vertically reciprocated towards and away from the upper side of said conveyor, which box is provided with as many vertical pistons projecting downwards as are the cavities in each length of the conveyor intermittently advanced; which pistons being regularly spaced at the same distance as said cavities are lowered into the latter with the reciprocating movement of said box; which pistons cooperate each with a switch contained in said box to open said switch whenever the corresponding cavity is filled with a piece; the switches of the pistons being connected in parallel to one another; a drawer adapted for being reciprocated crosswise of the conveyor from a position on top of it to a position beside it by means of a lever which contacts a cam on the apparatus main shaft; which lever is provided with a notched projection intended for engaging a catch pivotally mounted on the apparatus frame; a solenoid being provided in front of said catch which solenoid is electrically connected in series with said switches whereby whenever one only of the switches is closed and lets a signal pass through towards said solenoid, said catch is attracted and the lever released by which said drawer is reciprocated through a complete cycle.

4. An apparatus as per claim 1, wherein the stuffing device comprises a slide adapted for being reciprocated along horizontal guides of a frame integral with the apparatus frame in a direction at right angles to the conveyor and with its front side facing the same conveyor; said slide comprising the following components: as many horizontal cylinders as are the cavities in each intermittently advanced length of conveyor which cylinders are bored in the central section of the slide and communicate with a common manifold at the rear ends thereof; as many smaller hollow needles attached to the front side of the slide which communicate with the heads of said cylinders and are coaxial therewith; as many larger hollow needles with open tip attached to the front wall of a first chamber provided in front of said cylinder heads; said smaller needles being made to project across said first chamber and into said larger needles and coaxially thereto without reaching the free end of the latter; a second chamber being provided in front of said first chamber; said larger needles being made to pass across said second chamber through holes in the opposite walls thereof with sliding fitting said cylinders being provided with as many pistons slidable therein which are connected a their back ends to a transverse common yoke the ends of which are slidably guided in two slits of two arms projecting rearwards from the slide and is connected to the guiding frame of the slide by means of a spring; a three arm lever being provided for moving said pistons along the cylinders by one of its arms while a second arm slidably abuts against a straight cam with adjustable slope and the third arm is pivotally mounted on two side brackets extending downwards from the slide; the reciprocating movement of the slide being obtained through a cam mounted on said main shaft of the apparatus which cam drives a lever to swing in a plane perpendicular to said shaft and is connected to the slide by a link.

5. An apparatus as per claim 4 wherein said first chamber is provided with an inlet fitting which through a line is connected to said blower, a space being provided around the front wall of said chamber and the smaller needles for letting the pressurized air into the space between the smaller and larger needles to aid the outflow of paste through the holes at the tip of the larger needles and clear the needles of the residual paste; and said second chamber is provided with an inlet fitting on top of it which through a line is connected to said blower and an outlet opening at the bottom whereby the tips of the larger needles are cleaned by a jet of air when withdrawn from the stuffed piece.

6. An apparatus as per claim 1, wherein said means for intermittently advancing said conveyor comprises a vertical lever pivotally mounted at its lower end on the apparatus frame; which lever is driven to swing in a vertical plane parallel to the conveyor by a button cam follower which fits into a substantially sinusoidal groove on the outer surface of a cylinder mounted on said main shaft which lever at its upper end is pivotally connected to a spring biassed ratchet which engages riblike projections at the bottom of said cavities.

7. An apparatus as per claim 1, wherein said pump for feeding said paste to the stuffing device comprises a vertical cylinder which is sunk into the paste contained in a tank; within which cylinder a piston is slidably mounted the rod of which extending upwards has a spring wound around it which forces the piston upwards; the walls of said cylinder being provided of ports for the inletting of the paste when the piston is at its lowermost position; an outlet with check valve being provided at the head of the cylinder; a lever being pivotally mounted on the apparatus frame which lever being pivotally mounted on the apparatus frame which lever at one end thereof abuts against a cam of said main shaft and at the other end abuts against the upper end of the piston rod, whereby the cylinder is filled up with paste when the piston at the end of its downwards stroke, discovers said inlet ports and said paste is kept under constant pressure by said spring.